Patented July 22, 1952

2,604,492

UNITED STATES PATENT OFFICE 2,604,492

BIS-CHLOROBUTENYL SULFIDES

Warren D. Niederhauser, Philadelphia, Pa., assignor to Rohm & Haas Company, Philadelphia, Pa., a corporation of Delaware No Drawing. Application January 26, 1950, Serial No. 140,749

3 Claims. (Cl. 260—609)

This invention relates to bis-chlorobutenyl sulfides having the formulas $$ClCH_2CH=CHCH_2-S-CH_2CH=CHCH_2Cl$$

and $$CH_2=CH-CHCl-CH_2-S-CH_2CHClCH=CH_2$$

These new compounds which are also properly identified respectively as bis(4-chloro-2-butenyl)sulfide and bis(2-chloro-3-butenyl)sulfide are prepared simultaneously as a mixture of isomers by the reaction of one mole of sulfur dichloride, $SCl_2$, with two moles of 1,3-butadiene. The reaction takes the following courses:

$$SCl_2 + 2CH_2=CH-CH=CH_2$$

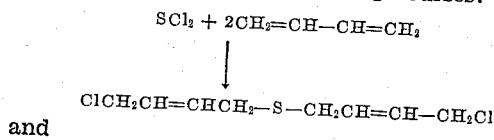

$$ClCH_2CH=CHCH_2-S-CH_2CH=CH-CH_2Cl$$

and $$CH_2=CH-CHClCH_2-S-CH_2CHClCH=CH_2$$

The two reactants combine quite readily even in the absence of a catalyst at temperatures from 0° C. to about 50° C., although the preferred temperatures are from about 10° C. to about 30° C. Superatmospheric pressure is not necessary but can be used if desired, and pressures up to about 100 pounds per square inch are satisfactory. Although the butadiene and sulfur dichloride react in the ratio of two molar equivalent weights of the former to one of the latter, it is apparent that an excess of either can be employed. Actually it is much preferred to have the butadiene in excess since this reduces the tendency of the sulfur dichloride to act as a chlorinating agent with the production of more highly chlorinated by-products. The use of solvents is recommended and for this purpose carbon tetrachloride is particularly satisfactory.

The two isomeric products which are formed simultaneously can be separated by fractional distillation, but for many purposes the separation is not necessary. For example, the mixture of isomers on reacting with an inorganic cyanide appears to yield only one dinitrile, presumably due to allylic rearrangement. This dinitrile is then readily hydrolyzed to a dicarboxylic acid which is very useful for the manufacture of alkyd resins. Alternatively the original mixture can be reacted with an aqueous solution of an alkali carbonate to produce a mixture of the isomeric glycols which can react with polycarboxylic acids, including the dicarboxylic acid described immediately above to form linear polyesters or alkyd resins. Or, the mixture of isomeric products of this invention can be readily converted into a mixture of isomeric diamines which can be reacted with dicarboxylic acids including the one described above to form polyamides. Thus the compounds of this invention serve as the source of dicarboxylic acids, glycols and diamines which are the chief materials used in the formation of polyesters and polyamides.

The following example serves to illustrate the preferred method of preparing the products of this invention.

*Example*

A flask, equipped with thermometer, agitator, reflux condenser, dropping funnel and inlet tube, was first charged with 360 parts of carbon tetrachloride which served as a solvent for the subsequent reaction mixture. This solvent was agitated and 216 parts of 1,3-butadiene and 103 parts of sulfur dichloride were added slowly and simultaneously to the solvent over a period of one hour while the temperature was maintained at 20°–25° C. by means of external cooling. After both of the reactants had been added, stirring was discontinued and the mixture was allowed to stand at room temperature for 15 hours. The solvent and uncombined reactants were then stripped off up to 90° C. under reduced pressure. There was obtained 181 parts of a yellow, oily residue which had a viscosity at 25° C. of .005 poise. This residue was distilled at 3 mm. of pressure (Hg) and the fraction boiling at 120°–140° C. which weighed 123 grams was again distilled. Practically all of it boiled at 118° C.–122° C. and 3 mm. pressure and the product was a pale yellow, oily liquid at room temperature. The product, a mixture of the two isomeric chlorobutenyl sulfides had a density of 1.1518, an index of refraction of 1.5280, a molar refractivity of 56.00 as against a calculated value of 55.91 and molecular weight of 210 as against a calculated value for $(C_4H_6Cl)_2S$ of 211. The results of analysis were as follows: $Cl_2=33.9\%$; $S=14.6\%$; iodine number$=238$ as against the following calculated values: $Cl_2=33.6\%$; $S=15.2\%$; iodine number$=241$.

I claim:

1. As a new composition of matter a mixture of the isomeric bis-chlorobutenyl sulfides having the formulas

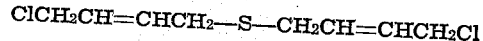

$$ClCH_2CH=CHCH_2-S-CH_2CH=CHCH_2Cl$$

and

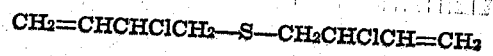

$$CH_2=CHCHClCH_2-S-CH_2CHClCH=CH_2$$

2. A process for preparing a mixture of the isomeric bis-chlorobutenyl sulfides having the formulas $$ClCH_2CH=CHCH_2-S-CH_2CH=CHCH_2Cl$$

and $$CH_2=CHCHClCH_2-S-CH_2CHClCH=CH_2$$

which comprises chemically combining two molar equivalent weights of 1,3-butadiene and one molar equivalent weight of sulfur dichloride at a temperature from 0° C. to 50° C.

3. A process for preparing a mixture of the isomeric bis-chlorobutenyl sulfides having the formulas $$ClCH_2CH=CHCH_2-S-CH_2CH=CHCH_2Cl$$

and $$CH_2=CHCHClCH_2-S-CH_2CHClCH=CH_2$$

which comprises chemically combining two molar equivalent weights of 1,3-butadiene and one molar equivalent weight of sulfur dichloride at a temperature from 10° C. to 30° C.

WARREN D. NIEDERHAUSER.

REFERENCES CITED

The following references are of record in the file of this patent:

UNITED STATES PATENTS

| Number | Name | Date |
|---|---|---|
| 2,422,275 | Winning et al. | June 17, 1947 |
| 2,467,713 | Watkins | Apr. 19, 1949 |

OTHER REFERENCES

Backer et al., Recueill des Travaux Chimiques (French) Tome 54 (1935), pp. 52-56.